United States Patent
Singhal et al.

(10) Patent No.: US 11,487,010 B2
(45) Date of Patent: Nov. 1, 2022

(54) LASER RANGING OVER-HEIGHT VEHICLE DETECTOR SYSTEM (LARA-OHVD)

(71) Applicant: Research Foundation of the City University of New York, New York, NY (US)

(72) Inventors: Abhishek Singhal, Alexandria, VA (US); Anil K. Agrawal, New York, NY (US); Camille Kamga, New York, NY (US)

(73) Assignee: Research Foundation of the City University of New York, New York, NY (US)

( * ) Notice: Subject to any disclaimer, the term of this patent is extended or adjusted under 35 U.S.C. 154(b) by 645 days.

(21) Appl. No.: 16/569,114

(22) Filed: Sep. 12, 2019

(65) Prior Publication Data

US 2020/0081121 A1    Mar. 12, 2020

Related U.S. Application Data

(60) Provisional application No. 62/730,275, filed on Sep. 12, 2018.

(51) Int. Cl.
*G01C 3/20* (2006.01)
*G01C 1/00* (2006.01)
(Continued)

(52) U.S. Cl.
CPC ............ *G01S 17/86* (2020.01); *G01S 7/4806* (2013.01); *G01S 17/931* (2020.01);
(Continued)

(58) Field of Classification Search
CPC ...... G01S 17/86; G01S 7/4806; G01S 17/931; G01S 7/497; G01S 17/10; G05D 1/0214;
(Continued)

(56) References Cited

U.S. PATENT DOCUMENTS 3,419,847 A   12/1968   Bonney
3,716,833 A   2/1973   Roth
(Continued)

FOREIGN PATENT DOCUMENTS

CN    204043621    12/2014

OTHER PUBLICATIONS

Singhal, Abhishek, et al.; LADAR-based collision warning sensor to prevent over-height vehicle bridge hits; IET Intelligent Transport Systems, v 12, issue 7, 2018, pp. 689-695.
(Continued)

*Primary Examiner* — Yaritza Guadalupe-McCall
(74) *Attorney, Agent, or Firm* — Peter J. Mikesell; Schmeiser, Olsen & Watts, LLP

(57) ABSTRACT

A device for producing a triangular laser sheet. The device has an optical transmitter with a pair of plano-convex cylindrical lenses for circularizing infrared laser light and a plano-concave cylindrical lens for shaping the circularized light to produce a triangular laser sheet. A tilt sensor measures departure of the triangular laser sheet from a horizontal reference. The device projects a triangular sheet of infrared light that is useful for detecting over-height vehicles that are approaching a structure, such as a bridge.

13 Claims, 11 Drawing Sheets

(51) Int. Cl.
  G01S 17/86 (2020.01)
  G05D 1/02 (2020.01)
  G08G 1/16 (2006.01)
  G01S 17/931 (2020.01)
  G01S 7/48 (2006.01)
  G02B 13/00 (2006.01)

(52) U.S. Cl.
  CPC ......... G05D 1/0214 (2013.01); G05D 1/0248 (2013.01); G08G 1/16 (2013.01); *G01C 1/00* (2013.01); *G01C 3/20* (2013.01); *G02B 13/003* (2013.01); *G05D 2201/0213* (2013.01)

(58) Field of Classification Search
  CPC ......... G05D 1/0248; G05D 2201/0213; G08G 1/16; G08G 1/164; G01C 1/00; G01C 3/20; G02B 13/003
  See application file for complete search history.

(56) References Cited

U.S. PATENT DOCUMENTS

| | | | |
|---|---|---|---|
| 3,896,414 A | 7/1975 | Rulo | |
| 4,284,971 A * | 8/1981 | Lowry | G08G 1/096741 340/904 |
| 4,916,429 A * | 4/1990 | Hicks | G08G 1/04 340/436 |
| 5,276,426 A * | 1/1994 | LoBello | B60Q 1/52 200/61.42 |
| 5,389,812 A | 2/1995 | Arvin | |
| 5,390,719 A | 2/1995 | Barnes | |
| 5,424,713 A | 6/1995 | Thompson | |
| 5,710,553 A * | 1/1998 | Soares | B60Q 9/00 340/556 |
| 5,821,879 A * | 10/1998 | Liepmann | G08G 1/04 340/936 |
| 5,828,320 A * | 10/1998 | Buck | G08G 1/04 340/436 |
| 6,172,604 B1 * | 1/2001 | Heillman | B60Q 9/00 340/436 |
| 7,345,096 B2 | 3/2008 | Deecher et al. | |
| 7,877,209 B2 | 1/2011 | Harris | |
| 8,207,836 B2 * | 6/2012 | Nugent | G01S 15/931 340/901 |
| 8,212,660 B2 * | 7/2012 | Nugent | B60Q 9/006 340/901 |
| 8,354,920 B2 * | 1/2013 | Kole | G01C 5/00 340/901 |
| 8,448,594 B2 | 5/2013 | Dukes | |
| 9,718,402 B2 * | 8/2017 | Smyth | B60Q 9/00 |
| 9,847,025 B2 * | 12/2017 | Mohtashami | G08G 1/095 |
| 2004/0075847 A1 * | 4/2004 | McCracken | G01B 11/02 356/622 |
| 2004/0201495 A1 * | 10/2004 | Lim | G08G 1/096783 340/905 |
| 2007/0103282 A1 * | 5/2007 | Caird | G08G 1/165 340/686.6 |
| 2012/0139756 A1 * | 6/2012 | Djurkovic | G08G 1/095 340/905 |
| 2015/0120178 A1 * | 4/2015 | Kleve | G01C 21/32 701/408 |
| 2016/0356594 A1 * | 12/2016 | Sorenson | G01B 11/0608 |
| 2017/0025003 A1 | 6/2017 | Arpin | |
| 2020/0081121 A1 * | 3/2020 | Singhal | G01S 17/10 |

OTHER PUBLICATIONS

Agrawal, A., Xu, X., Chen, Z.: 'Bridge vehicle impact assessment'. Final Report, Project# C-07-10, University Transportation Research Center, New York State Department of Transportation, New York, 2011.

Sinfield, J.V.: 'Synthesis study: development of an electronic detection and warning system to prevent overheight vehicles from impacting overhead bridges' (Indiana Depailment of Transportation and Purdue University, West Lafayette, Indiana, 2010).

Nguyen, Bella, et al.; Understanding the problem of bridge and tunnel strikes caused by over-height vehicles Transportation Research Procedia 14 (2016) 3915-3924.

Georgia Department of Transportation; Warning Systems Evaluation for Overhead clearance Detection; Feb. 2017.

* cited by examiner

PRIOR ART

LASER RANGING OVER-HEIGHT VEHICLE DETECTOR SYSTEM (LARA-OHVD)

CROSS-REFERENCE TO RELATED APPLICATIONS

This application claims priority to and is a non-provisional of U.S. Patent Application 62/730,275 (filed Sep. 12, 2018), the entirety of which is incorporated herein by reference.

STATEMENT OF FEDERALLY SPONSORED RESEARCH OR DEVELOPMENT

This invention was made with government support under grant number DTRT12-G-UTCO2 awarded by the US Department of Transportation. The government has certain rights in the invention.

BACKGROUND OF THE INVENTION

The subject matter disclosed herein relates to systems for detection of over-height vehicles to prevent bridge hits. Impacts by over-height (OH) vehicles on bridges, commonly known as 'bridge hits', cause significant risk to safety and preservation of transportation infrastructure in the USA. Currently, available over-height vehicle detection systems (OHVDs) have specific site requirements, extremely high installation costs, and propensity for false alarms, which limit their field deployment to few locations.

Collisions between vehicles and transportation infrastructures, such as bridges, overpasses, and tunnels, are collectively referred to as over-height (OH) vehicle bridge hits or simply 'bridge hits' or bridge strikes. Globally, 'bridge hits' have been reported to occur in large numbers and frequently; causing millions of dollars' worth of damage to structures, lengthy traffic delays and detours, prolonged bridge closures because of the need for inspection and repairs, secondary accidents, and injuries to motorists. In extreme cases, bridge hits have resulted in fatalities, complete collapse of bridge structures, and even train derailments (in the case of railway bridges being hit); causing serious risk to motorists on affected roadway. With aging infrastructure and increasing gaps in transportation funding, the bridge agencies require innovative and cost-effective measures to protect these structures during their useful life, while providing a safe roadway for motorists.

Conventionally, bridge owners, mostly state or city Departments of Transportation (DOT), manage bridge hit problem by (i) prevention of bridge hits and (ii) detection and reporting of bridge hits, if they do occur. A multifaceted approach is usually needed to mitigate bridge hits. The severity of the bridge hit problem at site, critical nature of the asset (structure/road link), and budget constraints determine the method(s) selected for mitigation. Preventive measures directed towards the driver of the vehicle (for example, using authorized truck route maps and escort vehicle permits) are most challenging to enforce. Structural measures (for example, increasing vertical under-clearance, using sacrificial beams and advance warning structures like hanging rods/chains have liability and cost implications. The most economical approach for the agencies is to target the roadways by utilizing low clearance warning signs, pavement markings on roads, and/or fascia markings on the structure itself to warn the drivers. However, drivers often choose to disregard warning signs on low vertical clearance bridges on roadways. A more effective approach is to actively detect an OH vehicle approaching a low clearance bridge and take necessary corrective action (such as rerouting or stopping) before the vehicle reaches the bridge. In practice, over-height vehicle detection systems (OHVDs) have been reported to be highly effective (50-80%) in reducing the bridge hits, followed by sacrificial structure (30-50%) and passive signing techniques (10-20%). Numerous transportation agencies in the United States of America have utilized these systems and have found them effective in reducing bridge hits. However, site constraints and high initial total system cost (devices and installation) have limited their usage to a few locations. With more than 7000 low clearance bridges in the USA alone, transportation agencies require an affordable and reliable alternative which can provide required performance without compromising the accuracy of detection, while addressing site constraint issues.

Referring to FIG. 1, a typical OHVD includes an aligned optical transmitter (TX) 100 and a receiver (RX) 102 mounted on poles on opposite sides of a roadway 104 at a required detection height that corresponds to the clearance height of the bridge 114. The poles are at location 108. The transmitter 100 emits a light beam which is continuously detected by the receiver 102. As an OH vehicle 106 obstructs the light beam, the receiver 104 activates a warning sign 110 (e.g. flashing yellow beacons) and alarm (parabolic shielded bell, electronic siren, or horn) to alert the truck driver. Alternatively, a variable message sign (VMS) is often utilized to instruct the driver to stop on the side or if possible, take an exit 112 before the structure. The system can detect vehicles with speeds up to 75 MPH and is installed typically 1000 ft before the bridge 114 to provide safe stopping distance. Currently, all OHVDs installed in the United States, the United Kingdom, Germany, Australia, and Canada operate similarly. Only difference has been that optoelectronic sensors have utilized different light sources (visible, red, infrared) and modulation schemes to provide improved performance.

A single installation of the typical OHVD illustrated in FIG. 1 usually covers multiple traffic lanes. OHVDs utilizing dual beams provide direction discernibility, redundancy, and reduced false alarms. However, having both transmitters on the same side of the road sometimes results in sunlight interference. The Z-beam configuration overcomes this limitation by having one transmitter on each side of the roadway with matching receivers on the opposite side. Most state DOTs require the OHVDs to connect to a traffic management center for reporting OH detection/faulty operation through a field interface system.

The discussion above is merely provided for general background information and is not intended to be used as an aid in determining the scope of the claimed subject matter.

SUMMARY

A device for producing a triangular laser sheet. The device has an optical transmitter with a pair of plano-convex cylindrical lenses for circularizing infrared laser light and a plano-concave cylindrical lens for shaping the circularized light to produce a triangular laser sheet. A tilt sensor measures departure of the triangular laser sheet from a horizontal reference. The device projects a triangular sheet of infrared light that is useful for detecting over-height vehicles that are approaching a structure, such as a bridge.

In a first embodiment, a device for producing a triangular laser sheet is provided. The device comprising: an infrared laser source for emitting an infrared laser; an optical transmitter comprising: collimating optics comprising a first plano-convex cylindrical lens and a second plano-convex cylindrical lens that is disposed orthogonal to the first plano-convex cylindrical lens; beam shaping optics comprising a plano-concave cylindrical lens; wherein the collimating optics and the beam shaping optics are arranged such that the infrared laser sequentially passes through the first plano-convex cylindrical lens, the second plano-convex cylindrical lens and the plano-concave cylindrical lens, thereby producing a triangular laser sheet of infrared laser light; an optical receiver for receiving reflected infrared laser light; a processor for processing the reflected infrared laser light.

In a second embodiment, a laser ranging over-height vehicle detector system is provided. The system comprising: an overhead structure with a road traversing under the overhead structure; a device disposed proximate the overhead structure, the device comprising: an infrared laser source for emitting an infrared laser; an optical transmitter comprising: collimating optics comprising a first plano-convex cylindrical lens and a second plano-convex cylindrical lens that is disposed orthogonal to the first plano-convex cylindrical lens; wherein the collimating optics is arranged such that the infrared laser sequentially passes through the first plano-convex cylindrical lens and the second plano-convex cylindrical lens; a tilt sensor for providing a tilt angle; an optical receiver for receiving reflected infrared laser light; a processor for processing the tilt angle and the reflected infrared laser light.

In a third embodiment, a method for identifying an over-height vehicle is provided. The method comprising steps of: (1) projecting, onto a road, a triangular laser sheet of infrared laser light with a device, wherein the device comprises an infrared laser source for emitting an infrared laser; an optical transmitter comprising: collimating optics comprising a first plano-convex cylindrical lens and a second plano-convex cylindrical lens that is disposed orthogonal to the first plano-convex lens; beam shaping optics comprising a plano-concave cylindrical lens; wherein the collimating optics and the beam shaping optics are arranged such that the infrared laser sequentially passes through the first plano-convex cylindrical lens, the second plano-convex cylindrical lens and the plano-concave cylindrical lens, thereby producing a triangular laser sheet of infrared laser light; a tilt sensor for providing a tilt angle between the triangular laser sheet and the road; an optical receiver for receiving reflected infrared laser light; wherein the device is disposed on an overhead structure with the road traversing under the overhead structure; (2) calculating a height for a vehicle that is approaching the overhead structure on the road, the calculating using installed height of the device, a measured distance to the vehicle and the tilt angle, thereby producing a calculated height of the vehicle.

This brief description of the invention is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of the invention. In the drawings, like numerals are used to indicate like parts throughout the various views. Thus, for further understanding of the invention, reference can be made to the following detailed description, read in connection with the drawings in which.

DETAILED DESCRIPTION OF THE INVENTION

This disclosure describes a new, enhanced LADAR-based OHVDs (L-OHVDs), which is installed on the face of a structure to be protected and measures the height of an approaching vehicle before the safe stopping distance from the structure. The LADAR-OHVD exhibits enhanced features like vehicle detection, actual height measurement, and collision prediction with a reduction in reported false alarms. This system has exceptional precision and is well suited to detect OH trucks and tractor trailers approaching a low vertical clearance bridge. With superior performance and cost-effective installation, the disclosed L-OHVDs has the potential to reduce occurrences of 'bridge hits', thereby limiting consequences such as congestion and damages to bridge while sustaining safety of motorists.

This system, termed as LADAR over-height vehicle detector (or L-OHVD) combines LADAR, optical beam shaping, and traffic engineering principles to safely detect OH vehicles. Significantly different in operation than currently available OHVDs, the disclosed L-OHVD utilizes a novel optical design in the LADAR module to allow OH detection over long distances.

The L-OHVD sensor replaces conventional beam sensors (e.g. transmitter, receiver) and loop detectors with a single unit that works with existing signing and reporting mechanisms, while reducing installation costs and improving detection reliability.

Figure 2:
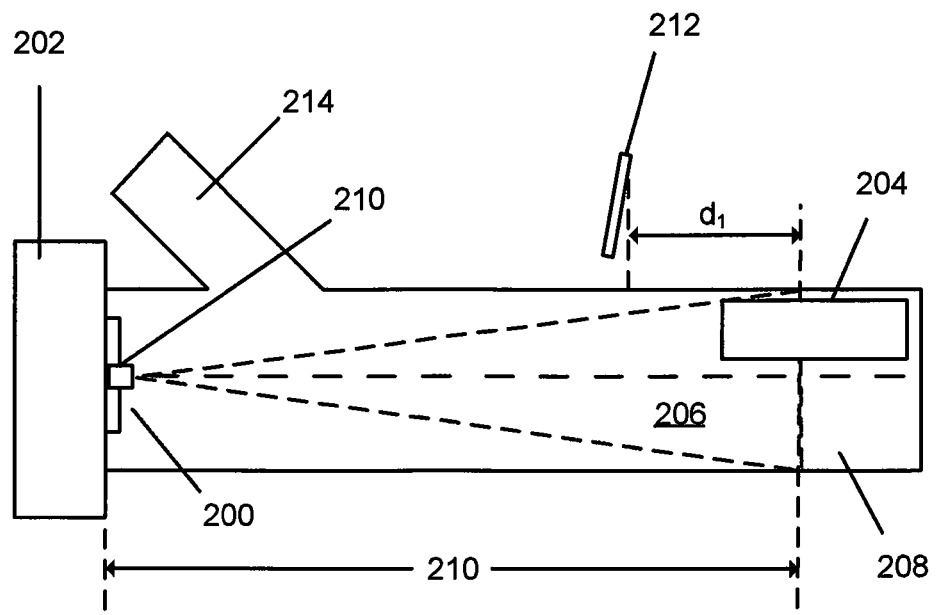
FIG. 2 is an aerial view of one embodiment of the disclosed over-height vehicle detection system.

FIG. 2 shows the layout of the disclosed L-OHVD. The L-OHVD sensor 200 is primarily designed to be installed on the face of the structure being protected. Here, the sensor 200 is mounted on the vertical face of a bridge 202 above the posted clearance height pointing towards the oncoming vehicle 204. The distance between the surface face of the bridge 202 and the sensor 200 has been exaggerated in the figures for illustrative purposes. The sensor 200 is positioned in the middle of the traffic lane and transmits a thin triangular laser sheet 206 towards the road 208. The laser sheet 206 travels beyond the safe stopping distance 210 and forms an invisible light barrier across the width of road 208 which is interrupted (reflected) by passing vehicles 204. The sensor 200 processes these reflected laser pulses to detect an approaching vehicle 204 and determine if it is over-height (OH). The sensor 200 is aligned such that any OH vehicle 200 closer than the safe stopping distance 210 will trigger an alarm. The alarm mechanism can be an oversized warning sign 210 (chosen as per the traffic agency's design guidelines) with message 'OVER HEIGHT VEHICLE STOP WHEN LIGHTS FLASH' along with two flashing beacons; both of which can also be installed on the bridge 202. An additional warning sign 212 can also be installed at a predetermined distance di (e.g. 100-150 ft) from the detection point 210. The location of exit 214 (if available) before the bridge will also govern the installation location.

Figure 3A:
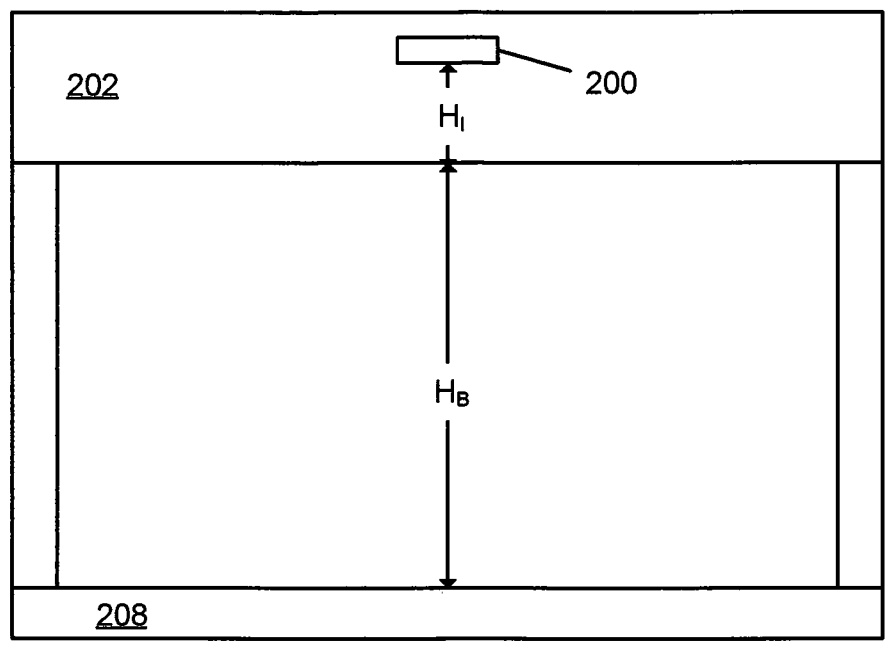
FIG. 3A is a front view of a bridge.
Figure 3B:
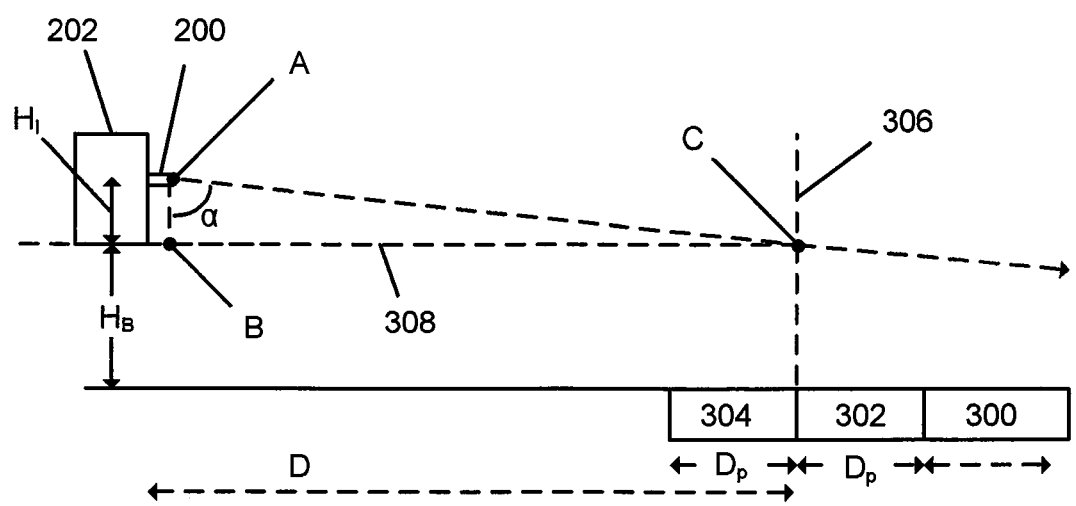
FIG. 3B is a profile view of one embodiment of the disclosed over-height vehicle detection system.

FIG. 3A is a face view of the bridge 202 above the road 208. The sensor 200 is installed at an install height ($H_I$) which is the distance between the lower surface of the bridge 202 and the emission point of the laser sheet 206. Referring to FIG. 3B, the L-OHVD system combines the sensor 200 with a tilt sensor to measure the orientation (given by angle α) of the laser sheet 206 relative to level surface. As shown in FIG. 3B the sensor 200 measures the beam tilt angle (a) and uses trigonometric identities to compute the distance to target. Three zones are defined according to a predetermined distance D and a zone size $D_p$. The distance D is set during installing by adjusting the tilt angle α such that the right angle on FIG. 3B is established such that the point C intercepts vertical line 306 at distance D while horizontal line 308 is coplanar with the lower surface of the bridge 202. At point C, measured height ($H_M$) is equal to $H_I$ which represents the maximum bridge clearance. For each installation site, four parameters were fixed: the bridge clearance height ($H_B$), the sensor install height ($H_I$=AB), the safe stopping distance (D), and the sensor tilt (α) which is adjusted so that BC=D. For heavy vehicles like trucks and trailers, a combination of vehicle mass, vehicle speed, road grade, and road surface condition should be considered while determining the safe stopping distance D. At any point along the laser path, the vehicle height ($H_V$) is given as $H_V=H_B+H_I-H_M$.

The three zones are as follows: First, an object detection zone 300 simply checks for a moving target approaching the bridge structure. Second, a vehicle detection zone 302 (from D to D+$D_P$) is established where range value is greater than AC. The sensor 200 commences height measurements in the vehicle detection zone 302. Third, an OH detection zone 304 (between D and D−$D_P$) is present.

Figure 4A:
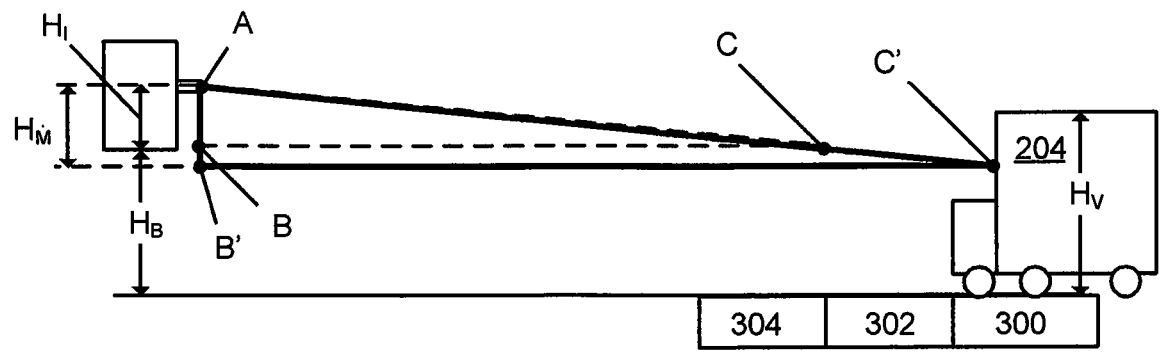
FIG. 4A is a profile view of an over-height vehicle in an object detection zone of the disclosed over-height vehicle detection system.

Referring to FIG. 4A, the laser sheet reflects off the vehicle 204 and the system detects an object (in this case vehicle 204) has entered the object detection zone 300. The distance to the vehicle 204 is given by B'C'=AC' sin α. The measured height ($H_M$) is given by ($H_M$=AC' cos α) although the system does not necessarily calculate $H_M$ while the vehicle 204 is in object detection zone 300. For an OH vehicle (see FIG. 4A) beyond point C, AC'<AC; which results in $H_M$<$H_I$ and $H_V$>$H_B$.

Figure 4B:
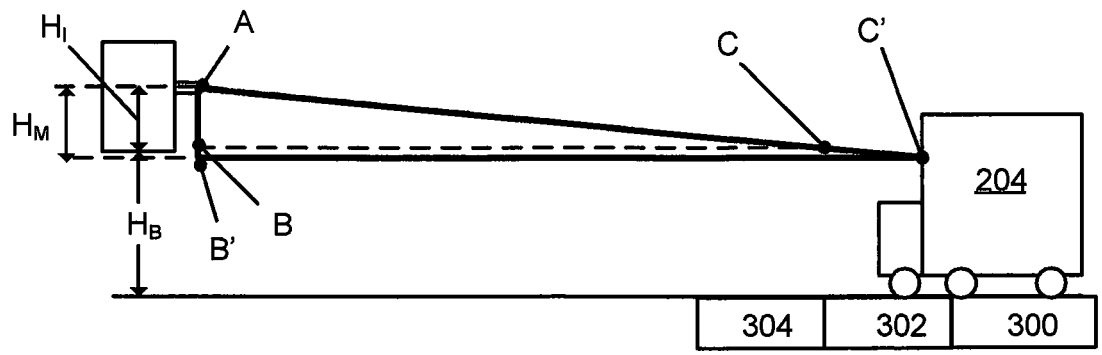
FIG. 4B is a profile view of the over-height vehicle in a vehicle detection zone of the disclosed over-height vehicle detection system.

Referring to FIG. 4B, the vehicle 204 has entered the vehicle detection zone 302. The system has now detected (1) an object was first present in the objection detection zone 300 and (2) that object has moved into the vehicle detection zone 302. Because both of these parameters have been satisfied, the system detects that the object is most likely a vehicle and may begin to measure $H_M$. This configuration helps reduce false positives that may be caused when an object (e.g. wild life, debris, etc.) enters the vehicle detection zone 302 without first passing through the object detection zone 300.

Figure 4C:
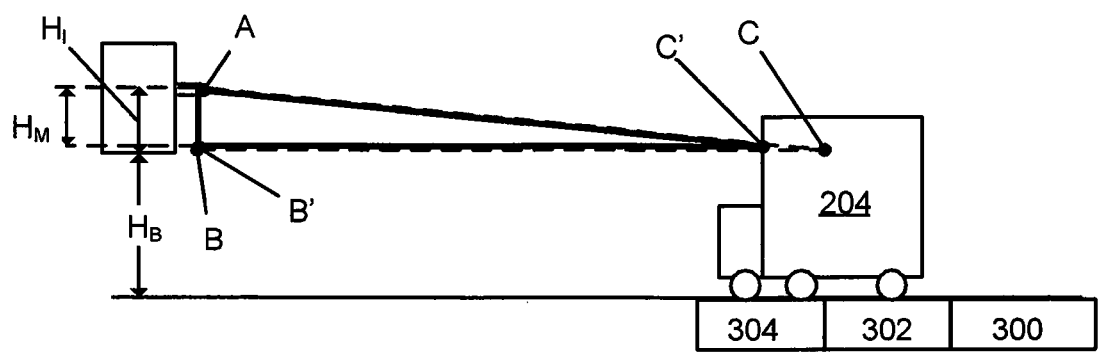
FIG. 4C is a profile view of the over-height vehicle in an over-height (OH) vehicle detection zone of the disclosed over-height vehicle detection system.

In FIG. 4C, the vehicle 204 has entered the OH vehicle detection zone 304. The system measures $H_M$ and compares the new value to the previously measured value of $H_M$ for the vehicle when it was in vehicle detection zone 302. The system detects that $H_M$ in zone 304 is smaller than $H_M$ in zone 302 (thus confirming a vehicle is inbound) and that the value of $H_M$ in zone 304 is less than $H_I$ (thus confirming the vehicle is OH). The system therefore activates the alarm and the corresponding warning sign.

Figure 5A:
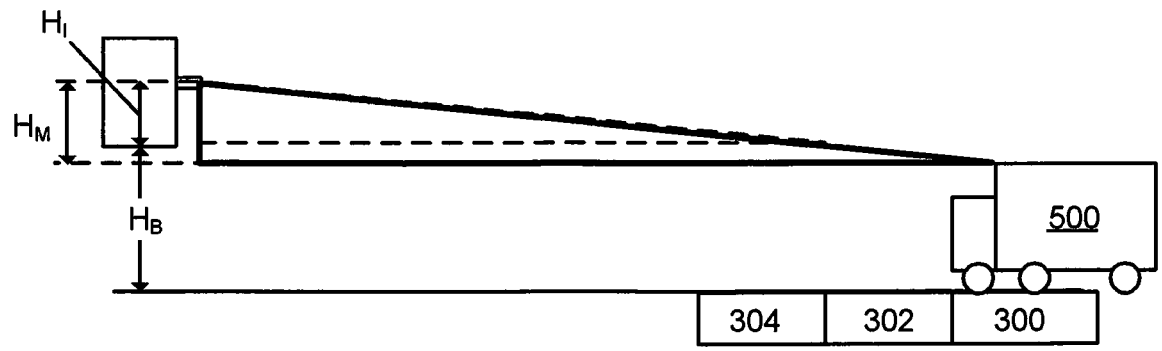
FIG. 5A is a profile view of a safely-sized vehicle in an object detection zone of the disclosed over-height vehicle detection system.
Figure 5B:
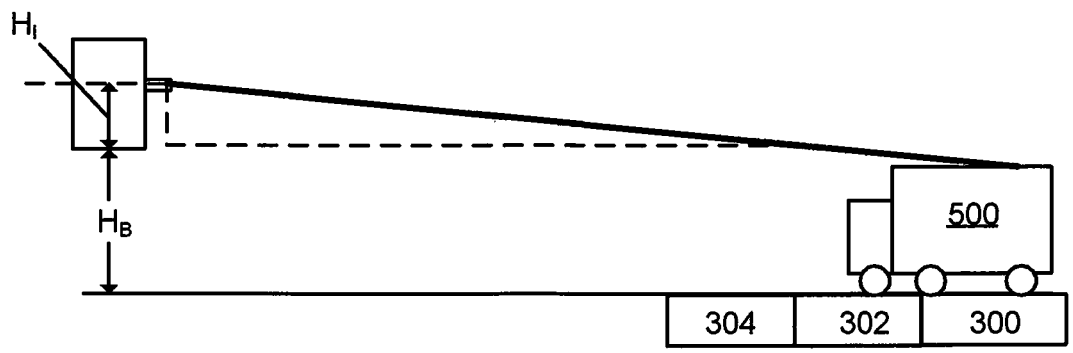
FIG. 5B is a profile view of the safely-sized vehicle in a vehicle detection zone of the disclosed over-height vehicle detection system.
Figure 5C:
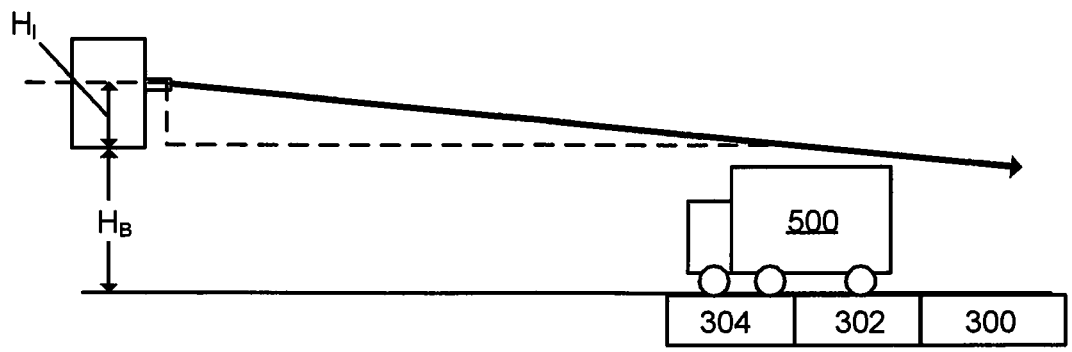
FIG. 5C is a profile view of the safely-sized vehicle in an over-height (OH) vehicle detection zone of the disclosed over-height vehicle detection system.

In contrast, FIGS. 5A to 5C depict a safely-sized vehicle 500 approaching the system. In FIG. 5A, the laser sheet reflects off the vehicle 500 and it is detected as an object in the objection detection zone 300. In FIG. 5B the vehicle 500 has passed into the vehicle detection zone 302 and the laser sheet has passed over the top of the vehicle 500. In FIG. 5C, the vehicle 500 has passed into the OH vehicle detection zone 304 but does not trigger the alarm. The scenario involving AC'>AC, $H_M$>$H_I$, and $H_V$<$H_B$ represents the case for all safe height vehicles.

Figure 1:
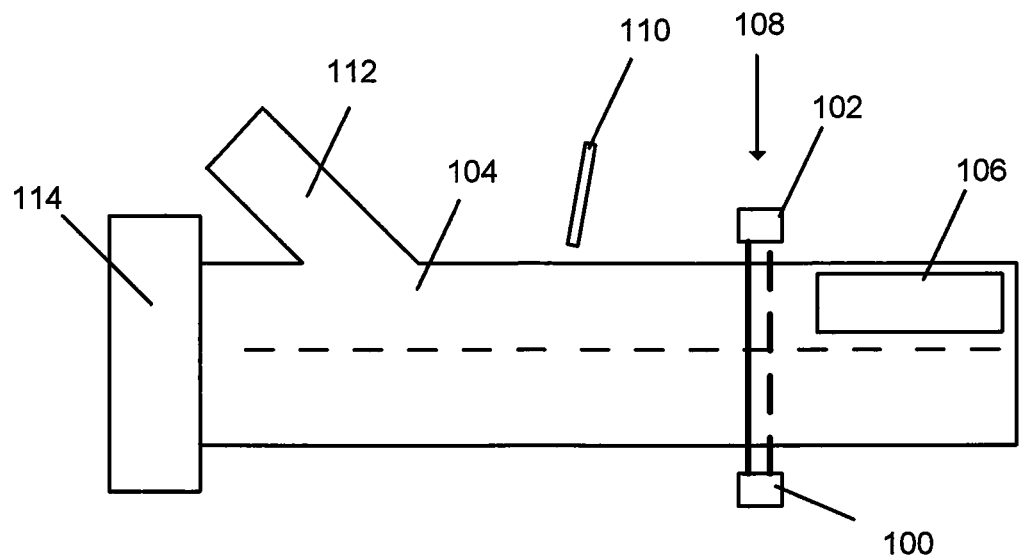
FIG. 1 is an aerial view of a conventional over-height vehicle detection system.

In one embodiment, the device is mounted at the side of the road. The device mounted on roadside structure functions like a conventional rangefinder (see FIG. 1) sending out laser pulses and waiting for a reflected pulse. The device is mounted at the desired detection height (clearance height of the structure) (e.g. on a pole) oriented perpendicular to the travel lanes such that the laser beam is perpendicular to the traffic flow and parallel to the road surface. A reflection of the beam from any vehicle that comes in the path of the beam; deems it as an over height vehicle. Here the over-height detection is possible due to the very low divergence of the laser sheet due to the disposed collimating optics. The beam shaping optics may be omitted from such an embodiment. OEM rangefinders cannot be used for over-height detection in this configuration as their divergence is too large (beam size at vehicle is too large) to discriminate height by small increments (inches). The detection height threshold adjustments can be made in finer resolution of inches by just adjusting the device up/down on the pole.

The disclosed collimating optics in the rangefinder makes this roadside over-height detection possible. One could cover as many lanes in this approach only limited by the device maximum measurable range.

Figure 6:
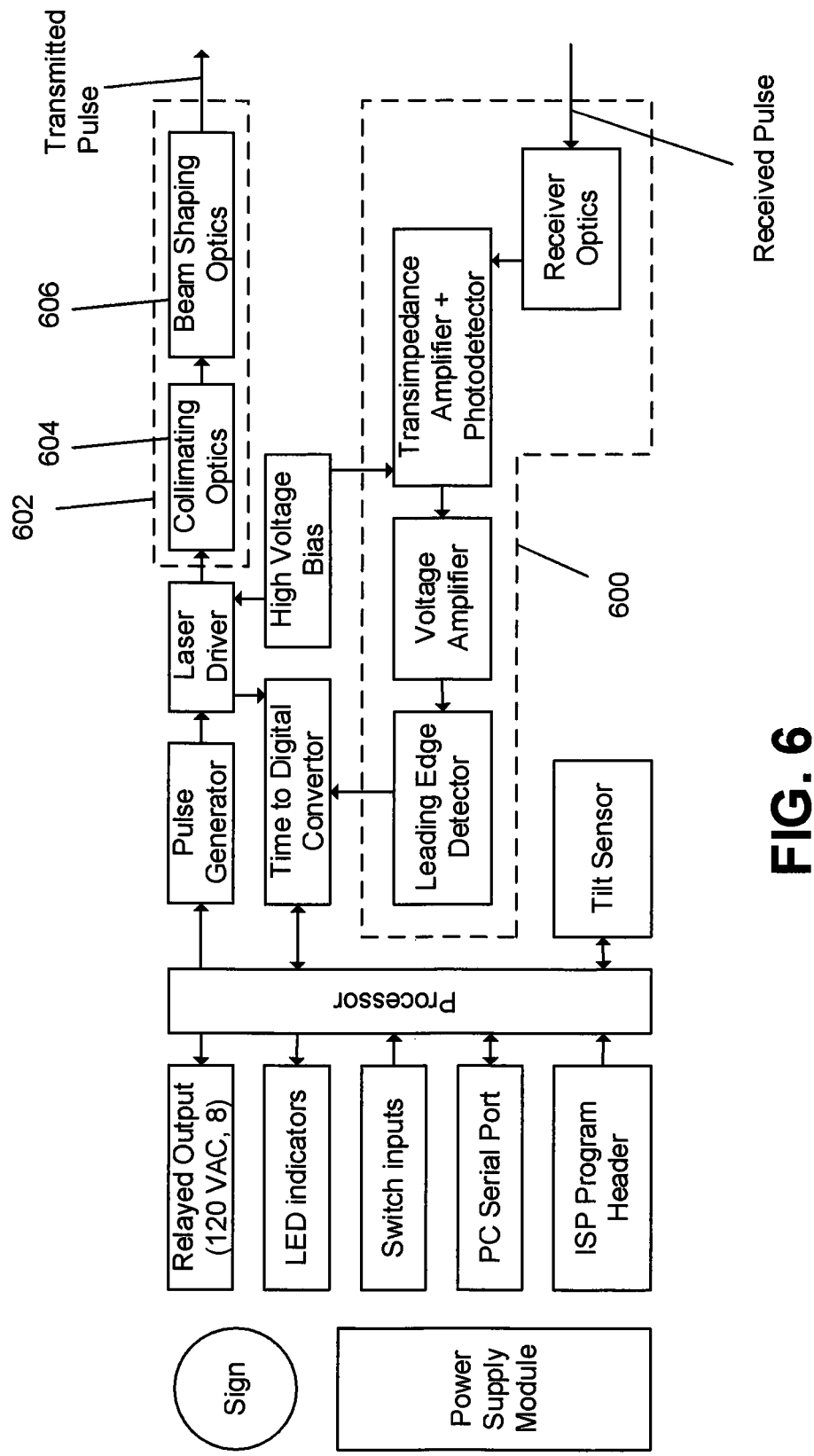
FIG. 6 is a schematic of one sensor for use with the disclosed OH vehicle detection system.

FIG. 6 is a schematic depiction of a sensor for use with the disclosed OH vehicle detection system. The optical receiver 600 includes conventional components such as a conventional optical receiver including a planoconvex spherical lens, a transimpedance amplifier and photodetector, a voltage amplifier and a leading-edge detector. The optical transmitter includes conventional components such as a pulse generator, a laser driver and further includes a customized optical transmitter 602. Optical transmitter 602 includes both collimating optics 604 and beam shaping optics 606.

Figure 7:
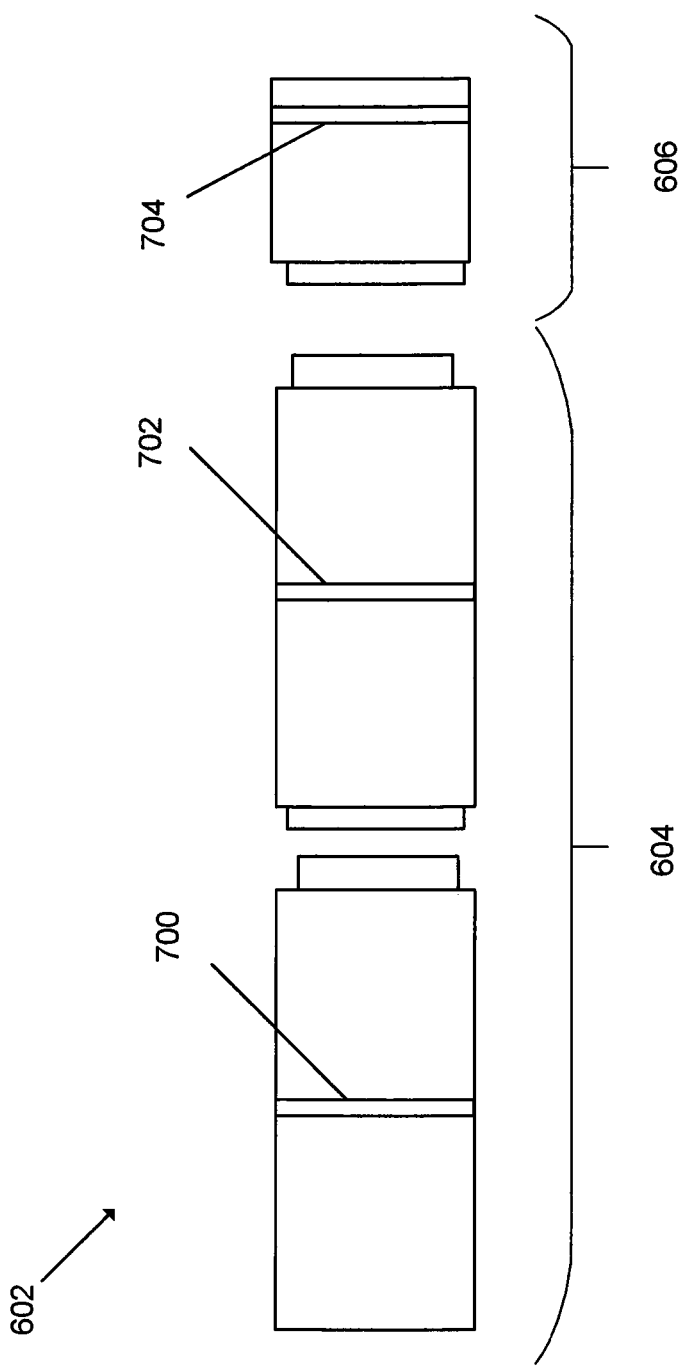
FIG. 7 is a schematic depiction of the transmitter optics.

FIG. 7 depicts the optical transmitter 602 in further detail. The collimating optics 604 comprise a first plano-convex cylindrical lens 700 and a second plano-convex cylindrical lens 702 that are orthogonally orientated. The focal length of each is relatively long. For example, the first plano-convex cylindrical lens 700 may have a focal length of 50 mm and the second plane-convex cylindrical lens 702 may have a focal length of 150 mm. The lenses may be disposed within an assembly tube for aligning the optics. The beam shaping optics 606 are also aligned. The beam shaping optics may comprise a single plano-concave cylindrical lens 704 with a negative focal length of, for example, 1000 mm.

Figure 8A:
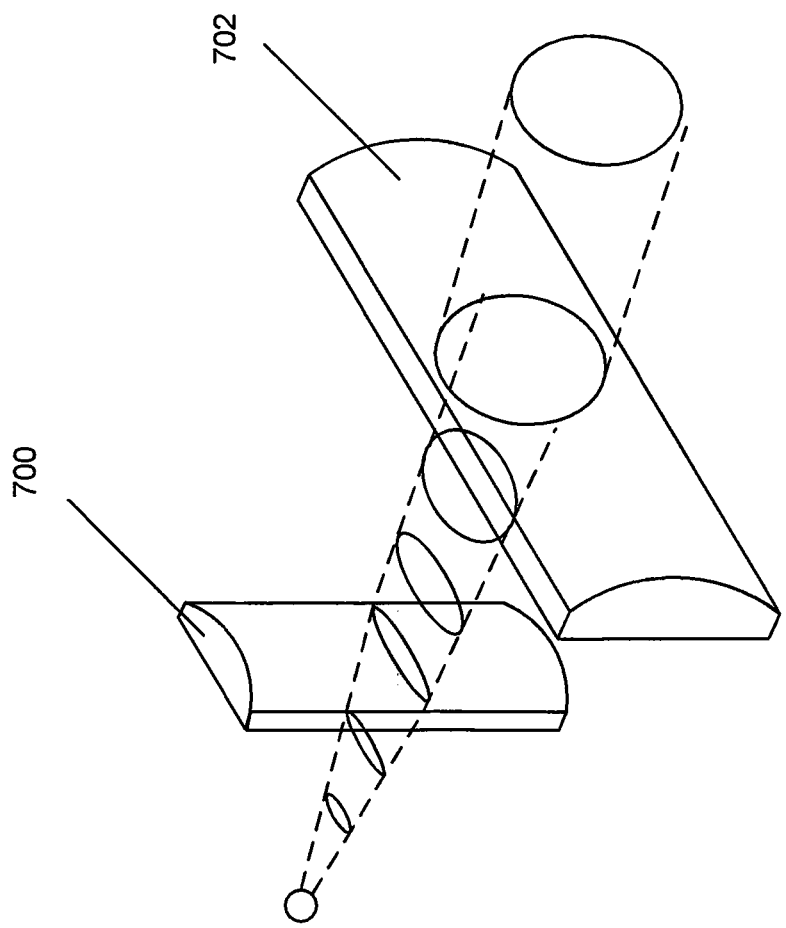
FIG. 8A depicts the light path through the transmitter optics.

FIG. 8A depicts the light path through the optical transmitter 602. The first plano-convex cylindrical lens 700 is spaced from the laser source by its focal length (e.g. 50 mm) while the second plano-convex cylindrical lens 702 is spaced from the laser source its by focal length (e.g. 150 mm). The lens of FIG. 8 are plano-convex cylindrical lenses with rectangular form factors. In another application the lenses have circular, rather than rectangular form factors. The ratio of focal lengths (e.g. 50 mm/150 mm) is based on the divergence of the laser source but the actual focal lengths are chosen based on the collimation required for the application. In one embodiment, very small divergence (e.g. 0.2 to 0.4 mrad) is useful.

Figure 8B:
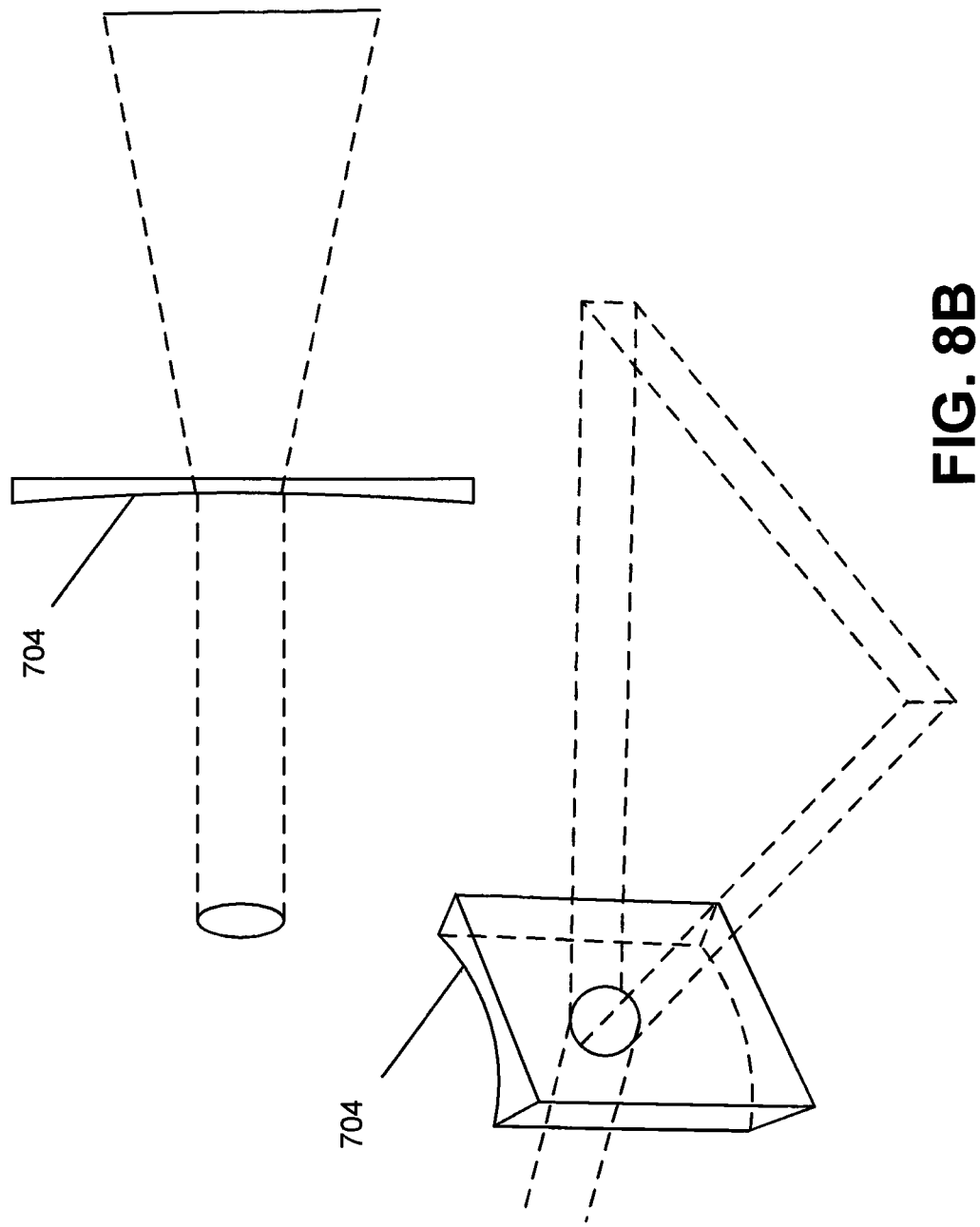
FIG. 8B depicts the light path through the beam shaping optics.

FIG. 8B depicts the light path through the beam shaping optics 606. The light from the optical transmitter 602 is passed through the plano-concave cylindrical lens 704. This shapes the laser into the triangular laser sheet 206. Based on 0.2 mrad divergence, the triangular laser sheet is about 2.5 inches thick at a target distance of 645 feet. The desired beam spread in horizontal direction (in other words the width of the laser sheet) at a given target distance can be changed by simply changing the focal length of the beam shaping lens. For example, at target distance of 645 feet, a focal length of 1000 mm produces a laser sheet width of around 15 feet.

L-OHVD provides improved accuracy of detection with minimal false alarms using three-tier false alarm recognition process. First, any readings beyond the predefined detection zone are neglected. Second, due to the continuous ranging process, it is possible to distinguish between a vehicle moving towards the structure and a bird or debris flying randomly through the beam. Additionally, the sensor can utilize a multi-hit detection capability through which multiple reflections (targets) can be detected with a single transmitted pulse. Thus, a laser pulse reflected from a bird can be distinguished from the pulse reflected by an approaching vehicle. This can also greatly reduce the probability of false alarms during inclement weather conditions (fog/rain/snow), where intermittent reflections from rain/snow can be differentiated from those of an approaching vehicle. Thus, L-OHVD offers substantial redundancy in detecting false alarms, which is a significant improvement over currently available OHVDs.

New Optical Design

The transmitter electronics is comprised of a high-power pulsed laser diode and a laser driver which generates a laser pulse of the required power, pulse width and frequency. In one embodiment, the infrared laser diode has 905 nm wavelength and peak power of 75 watts. The laser driver based on power MOSFET switch has current pulse output up to 50 A with maximum pulse repetition frequency of 11 Khz and fixed pulse width of 15 nsec. The laser driver has a fixed pulse rise time of 2.5 nsec. The laser driver requires a high voltage bias which is provided by a DC-DC high voltage convertor. The controller sends a trigger pulse to pulse generator (monoshot) which produces the input pulse for the laser driver.

Figure 9:
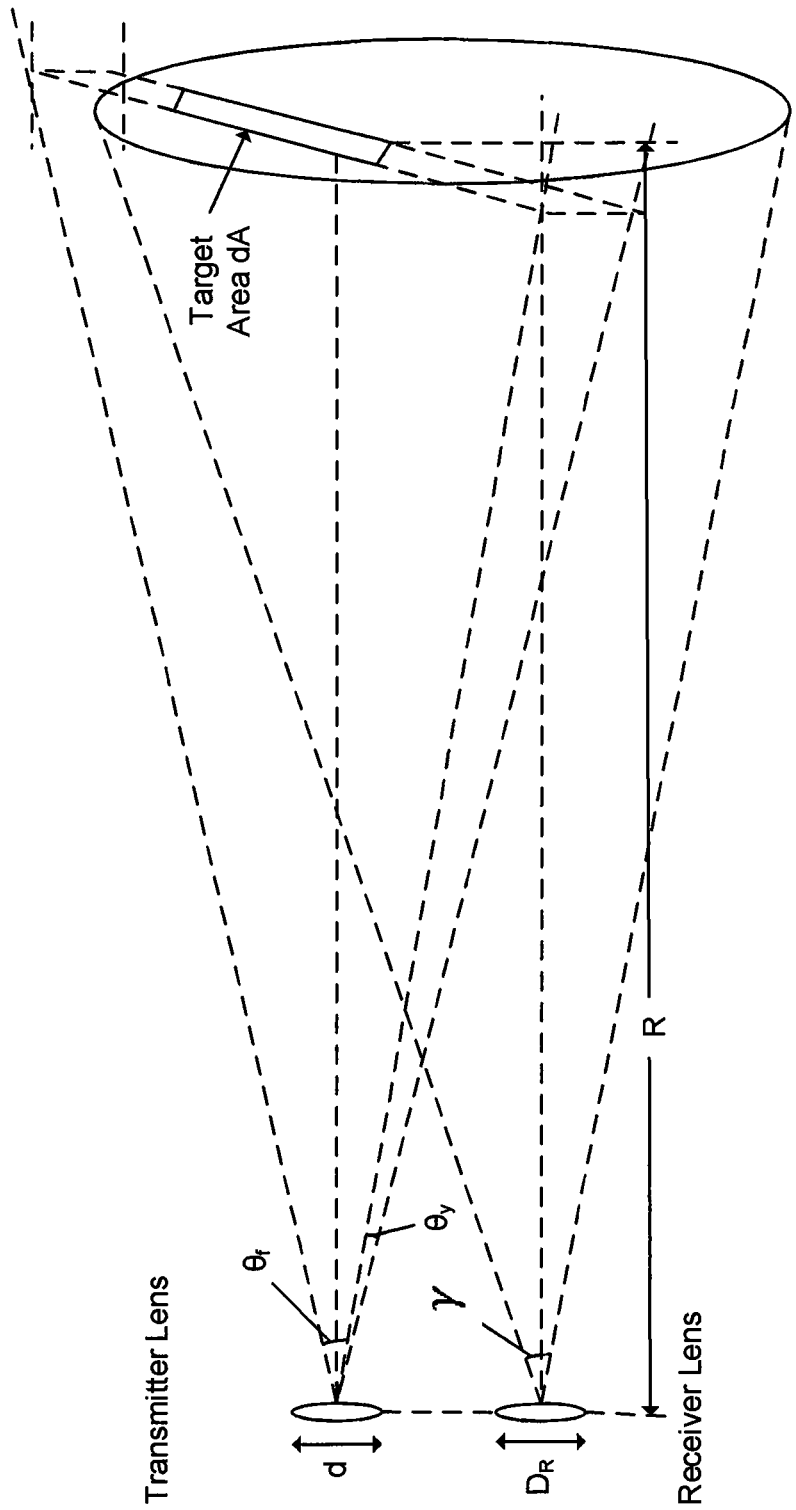
FIG. 9 is a schematic depicting parameter of the triangular laser sheet.

Conventional OEM LADAR modules utilize a combination of aspherical lens and beam expander to collimate (reduce divergence) and circularize the laser diode beam. However the resulting beam is still elliptical due to the asymmetrical divergence (fast axis, slow axis) of laser diodes. The output beam has typical divergences of 1 to 3 mrad. Such beam characteristics are suitable for conventional applications of OEM laser rangefinders but cannot be used in our over-height detection application. We thus chose a novel laser diode collimating scheme which is not used in standard laser rangefinders. To collimate the laser diode beam we utilized a pair of orthogonally oriented long focal length cylindrical plano-convex lenses. A high-power cylindrical lens is used to collimate the laser diode beam in fast axis while a lower power cylindrical lens collimates the beam in slow axis. The focal lengths of two lenses are chosen such that after collimation, the beam sizes in fast and slow axis is same resulting in a circular, collimated beam, with very small divergence ($\theta_y$ in FIG. 9) in fast axis (0.2 mrad) which is desirable in our application.

To transform the laser beam shape into a triangular laser sheet, many OEM LADAR modules use cylindrical rod lens or Powell lens. The cylindrical rod lenses have an associated intensity reduction factor imposed on the Gaussian intensity distribution of the collimated laser diode beam. This results in the intensity profile of the laser line to have a narrow central peak and longer tail distribution. This is undesirable in the current application as uniform intensity distribution is desired. The Powell lens produces a laser line with uniform intensity distribution but has limited working range and the flat top profile is lost at longer ranges which is not suitable for our application. A plano-concave cylindrical lens was utilized to transform a collimated laser diode beam into a triangular laser sheet. This results in a laser sheet of width (L) at long working distance (z). The advantage is that the input collimated laser beam has no restrictions on maximum beam diameter and thus the divergences can be reduced as desired by the application. There is no additional intensity reduction factor and the laser line beam intensity remains the same as the input collimated beam intensity (Gaussian). The lens is also inexpensive as compared to expensive Powell/rod lenses. Due to a negative focal length (virtual source), the size of the set-up is small and the lens can be placed just at the output of the collimating lenses. The biggest advantage is that by choosing a specific focal length (f) of the plano-concave cylindrical lens, the beam spread in the horizontal direction ($\theta_f$ in FIG. 9) can be customized to any desired value. This means a light barrier of any suitable width (L) can be created for a given target distance (z). In one embodiment, the lens is chosen such that, at specified stopping distance (z), the laser beam width (L) spans a width of a single lane of traffic (12 feet).

This combination of plano-convex cylindrical lenses for collimation and plano-concave cylindrical lens for beam shaping represents a new example in designing laser rangefinder transmitting optics and has not been reported before.

The disclosed L-OHVD has two enhanced capabilities. Apart from detecting OH condition, the sensor can measure the actual height of the vehicle ($H_v$). This can be a very useful collision statistic for agencies to plan appropriate recovery methods (in case a collision does occur). The sensor can also predict an impending collision or collision-like situation, particularly on high-speed highways. The sensor does this by measuring the vehicle speed beyond the safe stopping distance. If the vehicle is over-speeding, then it may hit the structure even while hard braking. Hard braking can also result in rear-end crashes. The sensor can pre-emptively alert police/EMS/traffic agencies, providing crucial seconds for emergency response operations. This can help save lives, increase incident response times, and reduce ensuing traffic congestions (by timely diverting traffic) associated with bridge hits.

The disclosed L-OHVD simplifies the field installation and has a very low total system cost. The L-OHVD, being a single unit device, does not require structural supports or excavation across the road. The sensor is mounted on a bridge face using a simple camera bracket. The power/communication cables also need shorter runs. The cost of prototype was lower than the cheapest currently available OHVD sensor. There is no need for road loop detectors or an expensive VMS sign. The line of sight warning sign on the bridge, much like traffic lights and overhead signs, is difficult to miss by the driver of the OH vehicle. This simplifies design, planning, and installation, thereby reducing associated costs drastically.

One important part of the L-OHVD system is a custom-designed, programmable LADAR module with special beam shaping optics. In one embodiment, the laser transmitter utilizes a high-power pulsed laser diode driver with 905 nm wavelength, 15 ns pulse width, 1 kHz pulse repetition frequency, and 2.5 ns rise time. Infrared laser provides invisible operation, high atmospheric transmission, and improved weather (rain, fog) penetration. The avalanche photodiode (APD)-based laser receiver consists of a wideband transimpedance amplifier, a voltage amplifier, and a leading-edge detector. The timing unit has a resolution of 90 ps (about 13.5 mm) with maximum time of flight (TOF) measurement of 2 μs (about 980 ft), including a 4-fold multi-hit capability. A tilt sensor is incorporated in the design which has a resolution of 0.1°. Finally, a PC-based 'user interface' was developed to configure, monitor, and record data. Multiple design considerations were used to implement the LADAR module with the salient features described in the following.

LADAR module design considerations: To demonstrate the functionality of the device with sufficient range and accuracy, a basic LADAR design approach 'Pulsed time of flight with direct detection' was selected. The key design parameters based on this approach are given as:

$$\text{Range: } R = \frac{1}{2} * c * t \qquad (1)$$

$$\text{Range resolution: } \Delta R = \frac{1}{2} * c * \Delta t \qquad (2)$$

$$\text{Maximum range: } R_{max} = \frac{1}{2} * c * t_{max} \qquad (3)$$

$$\text{Range accuracy: } \sigma_R \sim \frac{c}{2} * t_{rise} * \frac{1}{\sqrt{S/N}} \qquad (4)$$

where c is the velocity of light, t the laser pulse TOF, $\Delta t$ the resolution of timer, $t_{max}$ the maximum measurable time by the timer, $t_{rise}$ the rise time of the laser pulse, and S/N the signal-to-noise ratio (SNR). The L-OHVD's maximum range, height measurement accuracy, and resolution are governed by specifications of the LADAR module. A minimum SNR of 10 is desired for any valid measurement. The laser beam should also be eye-safe for oncoming motorists and thus, the prototype is designed as a class 1 laser device (as per ANSI Z136.1-2007).

LADAR range equation analysis for L-OHVD: The LADAR range equation is used as an analytical tool for computing the power received ($P_{det}$) from a target illuminated by a laser pulse containing a given power ($P_t$). The range equation determines the choice of LADAR photodetector and reveals the design parameters which can be controlled to increase the received power at the detector. The standard range equation utilizes a circular-shaped laser beam (represented by a single divergence value), whereas the L-OHVD's beam shape is a thin rectangle (see FIG. 9) represented by two divergences $\theta_f$ and $\theta_y$, where $\theta_f \gg \theta_y$. The optical receiver's circular field of view is given by $\gamma$.

The modified range equation for L-OHVD's rectangular beam shape was derived, resulting in the detected power (Pdet) at the receiver as:

$$P_{det} = \frac{T_O T^2 D_R^2 \rho_t P_T (dA) \cos\varphi}{(d + R\theta_y) * (d + R\theta_f) R^2} W \qquad (5)$$

In (5), $T_O$ is the optical transmission factor, T the atmospheric transmission, $D_R$ the receiver lens diameter (50 mm), $\rho_t$ the target reflectivity (0.2), $P_t$ the transmitted laser power, dA the target area, $\varphi$ the angle of incidence on target, R the target range, d the transmitter lens diameter (25 mm), $\theta_y$ the beam divergence in vertical direction, and $\theta_f$ beam divergence (or fan angle) in horizontal direction.

A low value of reflectivity was chosen (considering a diffusive target) for a conservative power-range analysis. Based on the analysis, an APD-based design was chosen for a reliable detection. The analysis also revealed that L-OHVD with a 2.5-inch thick beam would detect any vehicle (width≥8 ft) up till the safe stopping distance of 645 ft. This makes L-OHVD system well suited to detect trucks and tractor trailers responsible for the majority (98%) of bridge hits in New York State. Smaller protruding vehicle features (like truck exhaust pipes/antennas) may or may not be detected based on their size, reflectivity, and surface characteristics.

Novel optical design for LADAR transmitter: Initially, conventional LADAR modules from 40 original equipment manufacturer (OEM) were reviewed for integration in the disclosed design. The transmitting optics of typical OEM modules includes aspherical lenses and beam expanders to collimate and circularize the laser diode beam. The typical beam divergence ranges from 2 to 3 mrad, which results in a 2-3 ft diameter (circular/oval) beam at a distance of 1000 ft. While the circular beam is wide enough for vehicle detection, it cannot be used for height discrimination. Additionally, the beam does not cover a single traffic lane (12 ft width). Some OEM modules also utilize additional beam shaping optics (like Powell lens or cylindrical rod lens) to generate a fan-shaped laser output. However, they have a very small working range. Thus, an OEM LADAR module could not be used directly in the disclosed application.

One contribution to L-OHVD operation is the design of LADAR transmitting optics to generate a triangular laser sheet of specific beam divergences in horizontal and vertical directions. This results in a beam with a rectangular cross-section of 12 ft by 2.5 inches at the desired range of 645 ft. Setting a new precedent in designing LADAR transmitting optics, a new combination of cylindrical lenses was utilized for collimation and beam shaping. The receiving optics also utilized a higher field-of-view than OEM modules to detect reflected pulses across the lane width. For test purposes, the device is interfaced with a beacon and mounted on a pole at the required height. The L-OHVD device can directly control a traffic beacon.

L-OHVD Device Specifications

Current OHVDs have an effective height detection accuracy of ±1.5 inches. The L-OHVD module was designed for a maximum range of 645 ft (stopping distance for a vehicle at 65 MPH), beam width of 12 ft (to cover a single lane of traffic), and beam thickness of 2.5 inches (comparable to that of current OHVDs).

L-OHVD beam shape measurements: Table 1 shows the designed and measured beam divergences (beam size) for L-OHVD. A good agreement is observed for horizontal axis (beam width). The beam width criteria (13.15 ft>12 ft) were satisfied. However, for vertical axis (beam thickness), the measured divergence is five times the designed value. This is attributed to the manual focal length adjustments and alignment of collimating optics. The beam is too thick (9.16 inches) for height discrimination at 645 ft. To compare L-OHVD performance with current OHVDs, the test distance was determined where the L-OHVD beam is 2.5 inches thick. This distance is at 130 ft where corresponding beam width is 31.64 inches.

TABLE 1

| Beam Axis | Beam divergence (mrad) | | Beam size for given divergence (inches) | | |
|---|---|---|---|---|---|
| | At design | At measured | Design at 645 ft | Measured at 645 Ft | Measured at 130 ft |
| Vertical $\theta_y$ | 0.2 | 1.085 | 2.5 | 9.16 | 2.48 |
| Horizontal $\theta_f$ | 23.04 | 20.28 | 178.8 (14.9 ft) | 157.86 (13.15 ft) | 31.64 (2.64 ft) |

L-OHVD range, accuracy, and calibration: In LADAR theory, targets with high reflectivity and low absorption for the laser wavelength are considered 'better' targets. Conservatively, a diffusive target (vehicle surface) was assumed and a poster board was utilized to test range measurements. To test for target color (absorption), both 'white' and 'black' colored poster boards were utilized to represent the best- and worst-case scenarios, respectively. The field device utilizes an advanced timing discrimination technique, making the reflected pulses independent of target characteristics. To measure vehicle height with sufficient accuracy, a real-time range calibration algorithm was implemented in the device.

Vehicle detection and OH measurements: The L-OHVD firmware implements the range calibration, vehicle detection, and height computation algorithms in real time. For demonstration purposes, the sensor was mounted at the desired height and was oriented towards a mock vehicle located >130 ft away. The mock vehicle consisted of a movable dolly with white/black poster board(s) of distinct heights. The mock vehicle was pushed towards the sensor simulating a typical site condition where a vehicle would approach a low clearance structure. Heights from 55 to 60 inches were tested for black and white targets and four graphs were obtained using test data for each case.

Figure 10A:
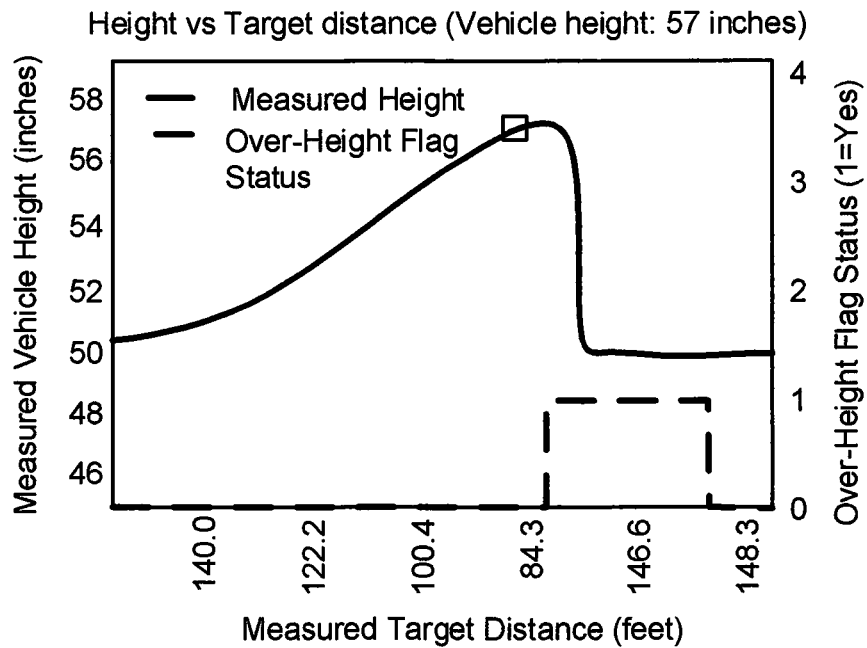
FIG. 10A shows a time series graph of measured height versus target distance.

FIG. 10A shows the 'measured height versus target distance' time series plot for a white, 57 inches high target. It is seen that the 'target distance' decreases, while the 'measured height' increases as the vehicle approaches the sensor within the beam path. The 'square' indicates the instant where measured height equals the desired clearance height (also set as 57 inches). The OH alarm is activated once L-OVHD detects this height. As the top of the vehicle comes out of the beam path completely, the sensor measures the default laser position (height and range), which in this test case is about 50 inches on the wall at about 145 ft distance.

Figure 10B:
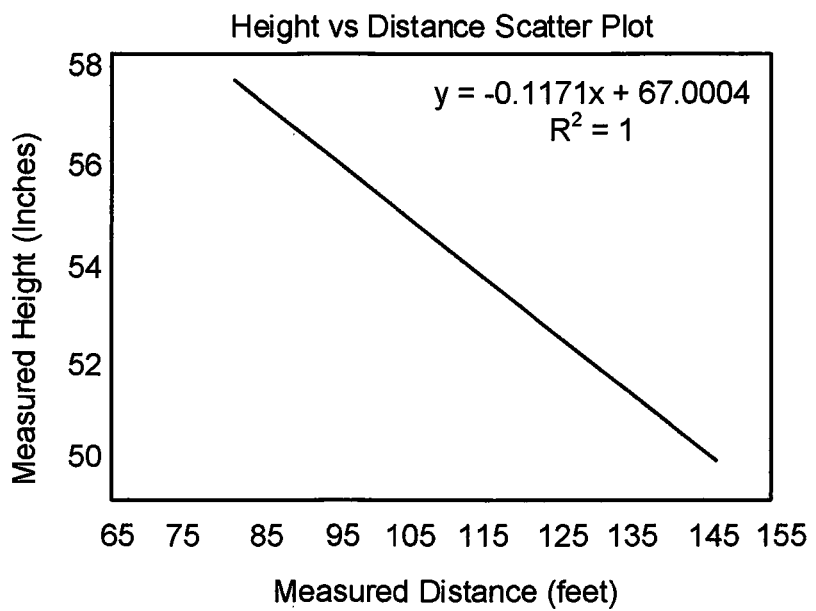
FIG. 10B shows a scatter graph of target distance versus vehicle height.

The 'linearity' scatter chart (FIG. 10B) plots the target distance on X-axis and the vehicle height on Y-axis. As can be seen, the sensor shows exceptional linearity ($R^2$ value=1), which is desirable for a reliable measurement. The overall height at which the sensor is installed is given by the Y-intercept (67 inches) with the slope representing the sensor tilt/orientation with respect to roadway (−0.1171). Since the sensor orientation and install height are fixed parameters for a site, one can always expect repeatable performance.

Figure 11A:
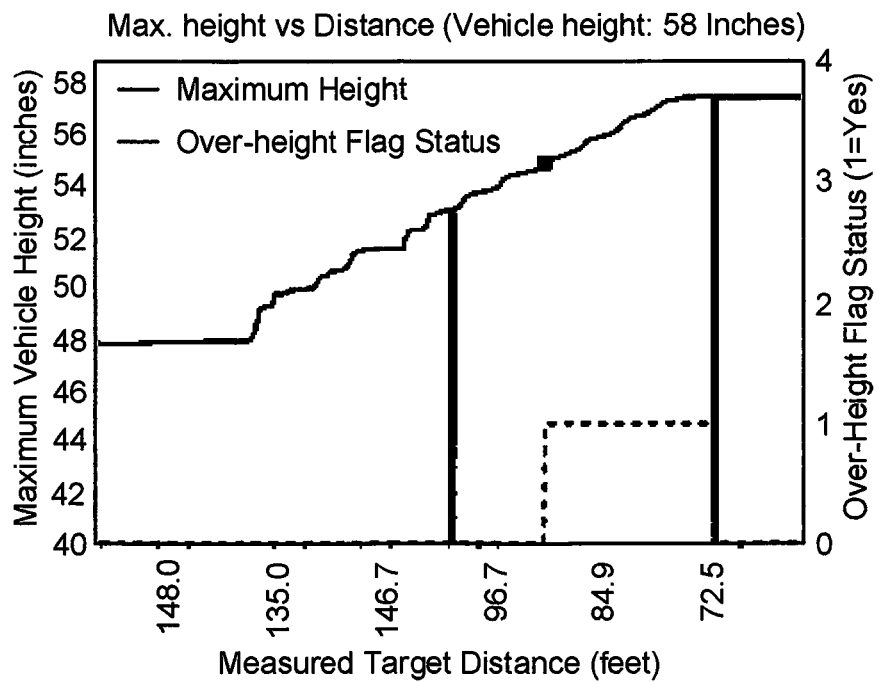
FIG. 11A is a time series graph of measured target distance versus maximum vehicle height.

The 'maximum height versus target distance' plot (FIG. 11A) indicates true vehicle height measurement beyond the set clearance threshold. Here, the clearance height is set as 55", while the actual target height is 58". Alarm is activated at 55" (square), but sensor keeps on measuring the height of vehicle as 57.74". This feature allows profiling of vehicles with asymmetrical cargo. The L-OHVD is also programmed to reset periodically to check for sensor failure and ensure reliable operation. The two gaps in the measurement cycle denote the sensor re-boot sequence. As can be seen, L-OHVD provides continuous detection from the last measured value.

Figure 11B:
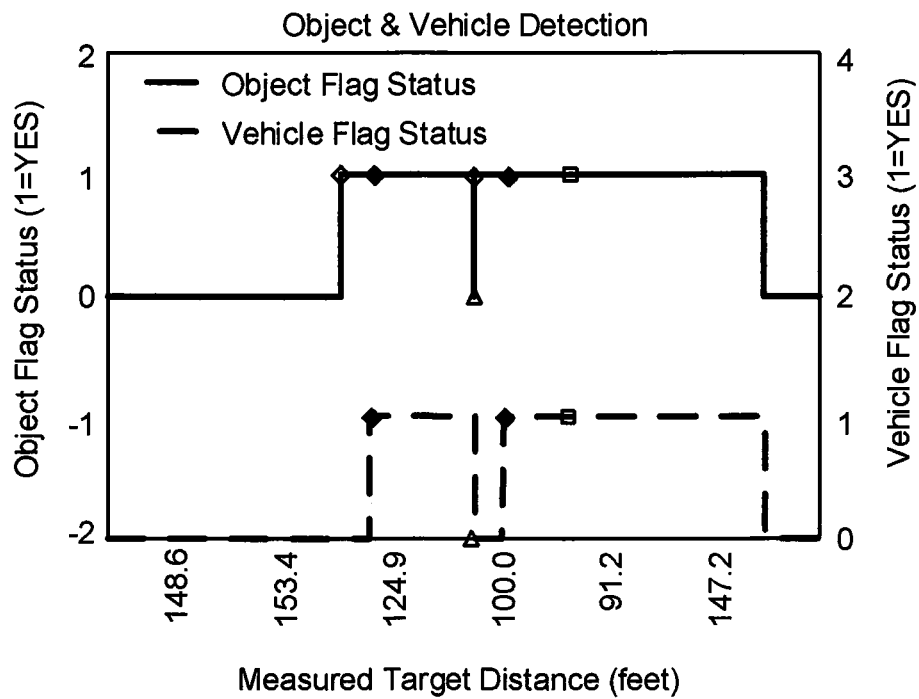
FIG. 11B is a time series graph of measured target distance versus object flag status.

FIG. 11B plots the 'object' and 'vehicle' flag status with respect to the 'target distance'. As shown in FIG. 11B, the sensor first detects an object in the path of the beam near 136 ft (first circle). Then the sensor tests to see if the object is a moving vehicle (which it is) and sets the vehicle detection flag (first diamond). The instantaneous vehicle height is computed based on the fixed beam orientation. At that distance (vehicle detection zone), the measured height $H_M$ is more than the fixed install height H1 (see FIG. 3A) and the sensor resets for next measurement cycle (at triangle). As the OH vehicle moves closer, its measured height $H_M$ reduces below the fixed install height $H_I$ (see FIGS. 4A to 4C). At this instant (square), the OH alarm is activated and the sensor resets after the alarm expires. Here, there are two cycles of object and vehicle detection resulting in guaranteed vehicle confirmation, thereby eliminating any false alarms. The height measurement results for both white and black targets are summarized in Table 2.

TABLE 2

Height measurements for white and black target vehicles

| Target color | Actual height, inches | Measured height, inches | Error, inches | Slope (beam tilt) | Y-intercept (install height) | R² |
|---|---|---|---|---|---|---|
| White | 55 | 56.38 | −1.38 | −0.117 | 66.99 | 1 |
|  | 56 | 57.06 | −1.06 | −0.117 | 66.99 | 1 |
|  | 57 | 57.82 | −0.82 | −0.116 | 66.92 | 0.99 |
|  | 58 | 58.56 | −0.56 | −0.117 | 66.99 | 1 |
|  | 59 | 59.21 | −0.21 | −0.116 | 66.92 | 0.99 |
|  | 60 | 59.91 | 0.09 | −0.111 | 66.99 | 1 |
|  | avg. error, inches |  | −0.66 |  |  |  |
| Black | 55 | 57.75 | −2.75 | −0.117 | 70.02 | 0.99 |
|  | 56 | 58.2 | −2.2 | −0.117 | 69.99 | 1 |
|  | 57 | 58.72 | −1.72 | −0.117 | 69.98 | 0.99 |
|  | 58 | 59.44 | −1.44 | −0.117 | 69.99 | 1 |
|  | 59 | 60.88 | −1.88 | −0.117 | 70.00 | 1 |
|  | 60 | 61.83 | −1.83 | −0.117 | 70.00 | 1 |
|  | avg. error, inches |  | −1.97 |  |  |  |

It is observed that L-OHVD is able to measure different heights with an excellent linearity ($R^2=1$), which indicates high level of precision. For white targets, the average error is −0.66 inches (within desired accuracy of ±1.5 inches), while the average error is −1.97 inches for black targets. The sensor install height of 67 inches (for white targets) and 70 inches (for black targets) is accurately reflected by the Y-intercept values. The beam orientation is fairly stable as indicated by the slope values. The cases where $R^2$ values differ slightly from 1 are due to transient sensor movement (vibration) or target misalignment (target vehicle momentarily comes outside the beam path). In the field implementation of the device, such instances would be identified in real time and height corrections would be applied.

Current beam-based OHVDs are effective in reducing hits, but come with high total system costs, recurring false alarms, and site constraints which limit their usage. Bridge owners require a cost-effective and reliable alternative that can be mass deployed without compromising the measurement accuracy. A new OH vehicle detection approach has been demonstrated with the development of the L-OHVD system. The L-OHVD system utilizes a novel optical design to produce a thin triangular laser sheet to profile vehicles over long distances. It is designed as a single unit, is unique in its operation, and is the only known sensor which can be installed on the face of a structure to be protected against impacts by an OH vehicle. It can measure the height of an approaching vehicle before the safe stopping distance and activates corresponding warning alarm. The prototype has a tested range of 220 ft which represents safe stopping distance for a vehicle travelling at 30 MPH on level grade. L-OHVD has excellent linearity and better accuracy than conventional OHVDs for white targets (±0.66 inches) and reduced accuracy for black targets (±1.97 inches). A major improvement is the very low probability for false alarms. L-OHVD with its multiple pulse detection capability, distinct vehicle detection zones, and algorithms provides sufficient redundancy to eliminate most (if not all) of false alarms. Advanced features include actual vehicle height measurement and collision prediction with major traffic and safety benefits. Other advantages stem from the use of relatively inexpensive line of sight warning sign which by driving habits can be hard to miss. L-OHVD is designed as a class 1 laser device and is eye-safe during all modes of operation. Finally, the cost of the entire L-OHVDs is very low with minimal design, infrastructure, and installation requirements. L-OHVD would be a cost-effective alternative where few traffic lanes need coverage.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A device for producing a triangular laser sheet, the device comprising:
    an infrared laser source for emitting an infrared laser;
    an optical transmitter comprising:
        collimating optics comprising a first plano-convex cylindrical lens and a second plano-convex cylindrical lens that is disposed orthogonal to the first plano-convex cylindrical lens;
        beam shaping optics comprising a plano-concave cylindrical lens;
        wherein the collimating optics and the beam shaping optics are arranged such that the infrared laser sequentially passes through the first plano-convex cylindrical lens, the second plano-convex cylindrical lens and the plano-concave cylindrical lens, thereby producing a triangular laser sheet of infrared laser light;
    an optical receiver for receiving reflected infrared laser light;
    a processor for processing the reflected infrared laser light.

2. The device as recited in claim 1, where in the infrared laser source, the optical transmitter, the tilt sensor, the optical receiver and the processor are housed within a single housing.

3. The device as recited in claim 1, wherein the optical transmitter produces an output with a divergence between 0.2 mrad and 0.4 mrad.

4. The device as recited in claim 1, further comprising a tilt sensor for measuring a tilt angle.

5. A laser ranging over-height vehicle detector system, the system comprising:
    an overhead structure with a road traversing under the overhead structure;
    a device disposed proximate the overhead structure, the device comprising:
        an infrared laser source for emitting an infrared laser;
        an optical transmitter comprising:
            collimating optics comprising a first plano-convex cylindrical lens and a second plano-convex cylindrical lens that is disposed orthogonal to the first plano-convex cylindrical lens;
            wherein the collimating optics is arranged such that the infrared laser sequentially passes through the first plano-convex cylindrical lens and the second plano-convex cylindrical lens;
        a tilt sensor for providing a tilt angle;
        an optical receiver for receiving reflected infrared laser light;
        a processor for processing the tilt angle and the reflected infrared laser light.

6. The system as recited in claim 5, wherein the device is disposed on a vertical surface of the overhead structure.

7. The system as recited in claim 6, further comprising beam shaping optics comprising a plano-concave cylindrical lens, wherein the collimating optics and the beam shaping optics are arranged such that the infrared laser sequentially passes through the first plano-convex cylindrical lens, the second plano-convex cylindrical lens and the plano-concave cylindrical lens, thereby producing a triangular laser sheet of infrared laser light downward toward the road.

8. The system as recited in claim 7, wherein the overhead structure has a desired clearance height and the device is installed at the height greater than the desired clearance height.

9. The system as recited in claim 7, wherein the triangular laser sheet has a beam spread is that user adjustable in a horizontal direction.

10. The system as recited in claim 5, wherein the device is disposed on a pole, wherein the pole is disposed adjacent the road.

11. A method for identifying an over-height vehicle, the method comprising steps of:
projecting, onto a road, a triangular laser sheet of infrared laser light with a device, wherein the device comprises an infrared laser source for emitting an infrared laser;
an optical transmitter comprising:
collimating optics comprising a first plano-convex cylindrical lens and a second plano-convex cylindrical lens that is disposed orthogonal to the first plano-convex lens;
beam shaping optics comprising a plano-concave cylindrical lens;
wherein the collimating optics and the beam shaping optics are arranged such that the infrared laser sequentially passes through the first plano-convex cylindrical lens, the second plano-convex cylindrical lens and the plano-concave cylindrical lens, thereby producing a triangular laser sheet of infrared laser light;
a tilt sensor for providing a tilt angle between the triangular laser sheet and the road;
an optical receiver for receiving reflected infrared laser light;
wherein the device is disposed on an overhead structure with the road traversing under the overhead structure;
calculating a height for a vehicle that is approaching the overhead structure on the road, the calculating using installed height of the device, a measured distance to the vehicle and the tilt angle, thereby producing a calculated height of the vehicle.

12. The method as recited in claim 11, wherein the overhead structure has a clearance height, the method further comprising comparing with the calculated height of the vehicle to the clearance height.

13. The method as recited in claim 12, further comprising activating an alarm if the calculated height is more than the clearance height.

\* \* \* \* \*